United States Patent [19]
Kaiser

[11] Patent Number: 5,901,652
[45] Date of Patent: May 11, 1999

[54] FUNCTIONAL FURNITURE CONFIGURATIONS CREATED FROM INTERCHANGEABLE PLANAR PANELS AND METHOD FOR ASSEMBLY

[75] Inventor: Marina C. Kaiser, Wilmington, Del.

[73] Assignee: Magination, Inc., Wilmington, Del.

[21] Appl. No.: 08/675,542

[22] Filed: Jul. 3, 1996

[51] Int. Cl.$^6$ .................................................. A47B 3/06
[52] U.S. Cl. ...................... 108/191; 108/190; 108/158.3
[58] Field of Search .................... 108/180, 191, 108/190, 153.1, 150, 157.1, 157.16, 158.12, 159.11, 158.13

[56] References Cited

U.S. PATENT DOCUMENTS

| | | | |
|---|---|---|---|
| 1,268,191 | 6/1918 | Wanner | 108/150 |
| 3,742,871 | 7/1973 | Kienel | 108/150 |
| 4,345,526 | 8/1982 | Streit | 108/191 |
| 4,501,512 | 2/1985 | Hiltz | 108/153 X |
| 4,760,800 | 8/1988 | Hanson | 108/190 |

FOREIGN PATENT DOCUMENTS

| | | | |
|---|---|---|---|
| 202526 | 11/1986 | European Pat. Off. | 108/180 |
| 923008 | 4/1963 | United Kingdom | 108/190 |

*Primary Examiner*—Jose V. Chen
*Attorney, Agent, or Firm*—Milde, Hoffberg & MacKlin, LLP

[57] ABSTRACT

A modular furniture unit includes vertical panel members which are fixed to a horizontally planar base panel and a horizontally planar top panel. In a first embodiment two coplanar vertical panel members are fixed to a vertical support panel by pins received through the support panel, and the horizontal panels are fixed to the vertical panels by bolts which are secured by rotatable cams in the vertical panels. In a second embodiment two vertical panel members are provided with interengaging vertical slots so that they can be fitted together at right angles without any support panel.

53 Claims, 5 Drawing Sheets

FUNCTIONAL FURNITURE CONFIGURATIONS CREATED FROM INTERCHANGEABLE PLANAR PANELS AND METHOD FOR ASSEMBLY

FIELD OF THE INVENTION

The present invention relates to modular furniture consisting of multiple configurations of functional furniture created from a variety of horizontal and vertical planar panels designed specifically to interchange with one another as well as to assemble and disassemble with ease. The present invention also includes a method for assembling a representative configuration of functional furniture.

Attention is called to the U.S. Pat. Nos. 3,742,871 to Kienel; 4,202,645 to Giovannetti; and 4,321,875 to Danko.

BACKGROUND OF THE INVENTION

Customers within the display and furniture industries have recognized the need for versatile, portable, durable furniture units which are easy to assemble and disassemble, which will stack compactly for shipping or storage, and will easily reconfigure to meet changing needs. Such functional units of furniture have application as display stands for art galleries, tables and stools for retail and industry use, and furniture for children, trade shows, restaurants, and homes.

Conceptually functional units of furniture such as tables and stools involve the vertical support of a horizontally planar surface (e.g., the top of a given furniture unit) above another horizontally planar surface (e.g., the floor or an attached base of the given furniture unit). Pre-assembled furniture units are often bulky to warehouse, expensive to ship, and cumbersome to move. Furniture units labeled ready-to-assemble (RTA) or knock-down (KD) often require complicated assembly instructions, a lengthy time to complete the project, and no guarantee that the completed unit will disassemble and reassemble. Moreover, in the above, each furniture unit is likely offered as a set package which combines a predetermined height and width of vertical planar piece(s) with a predetermined length and width of horizontal piece(s). Neither vertical nor horizontal piece(s) can be easily reconfigured to create a different functional unit of furniture.

Using one known technique, the vertical structural members are held together using structural reinforcement members. These structural reinforcement members consist of short wooden dowels. The wooden dowels are inserted horizontally between the vertical structural members at the top and bottom of the vertical structural members to cause self alignment and increased structural integrity. Cams and bolts are used between the vertical structural members and the horizontally top planar surface. If there was a horizontally base planar surface, cams and bolts are also used between the horizontally base planar surface and the vertical structural members. There are problems with using wooden dowels to hold the vertical structural members together since the wooden dowels tend to swell in humid weather making assembly and disassembly difficult.

Another known technique uses short steel pins as structural reinforcement members instead of wooden dowels. Problems also occur with this technique since the short steel pins are not long enough to penetrate the interior of the vertical structural members sufficiently. With rough handling, the vertical structural members could be torqued out of alignment. This effects structural stability. Thus, despite a large effort expended by designers and manufacturers of furniture, many drawbacks still exist.

Accordingly, it is an object of the present invention to interconnect a vertical support member to vertical panel members in a manner which provides good structural integrity and strength, pleasing aesthetic appearance, and economy of production.

Another object is to provide a functional unit of furniture that is sturdy yet can be quickly disassembled into stackable, flat panels for efficient shipment or storage.

Still another object is to provide a functional unit of furniture that is easy to assemble and disassemble.

Yet another object of the invention is to provide an interconnection of all horizontal surfaces and vertical members to withstand stress reasonably anticipated in assembly, disassembly, reassembly, and utilization of the assembled functional unit of furniture.

A further object of the present invention is to provide multiple functional furniture configurations easily created from varying shapes and dimensions of horizontal and vertical planar members designed to interchange with one another. The interchangeable factor allows for reconfiguration of any and all unit members at any time to create a different functional furniture configuration suited to changing needs.

These and still further objects will become apparent hereinafter.

SUMMARY OF THE INVENTION

Accordingly, the present invention provides for modular furniture configurations comprised of combining varying shapes and dimensions of horizontal planar members with varying shapes and dimensions of vertical planar members all of which have been specifically designed for interchangeability, improved structural integrity and a method of assembly, disassembly, and/or reassembly of the same or different planar members insuring ease and efficiency. The present invention addresses the burdens associated with the prior art and the limitations identified in the display and furniture industries.

To attain this, any representational configuration of the functional furniture unit embodied in the present invention has at least one vertical member structure, a horizontally planar top surface in contact with and supported by the vertical member structure, means for securing the top surface to the vertical member structure in a manner providing for interchangeability and ease of assembly and disassembly, a horizontally planar base surface positioned beneath the vertical member structure and means for securing the base surface to the vertical member structure in a manner providing for interchangeability and ease of assembly and disassembly. The means for securing the top surface and base surface to the vertical member structure could be bolts, screws, rods, dowels, pins, rivets, clamps, cams, clevis pins, or any means providing for easy assembly and disassembly. The vertical member structure has a vertical support member having predetermined height, width and depth measurements. The vertical support member has at least two faces or sides and a plurality of edges or surfaces adjoining the faces or sides. One of the faces has at least one hole extending through it to the opposing face of the vertical support member.

There is at least one associated elongated rodlike element for each hole of the vertical support member. The element(s) has a first end, second end, and intermediate portion. The intermediate portion of the element(s) is disposed in the channel of the vertical support member. The first end and second end protrude from the vertical support member.

There is a first vertical panel member having at least two faces or sides and a plurality of edges or surfaces adjoining the faces or sides. At least one edge of the first vertical panel member has at least one bore wherein the first end(s) of the element(s) engages the bore(s) and interconnects the first vertical panel member to the vertical support member at a first predefined angle. This could be but is not limited to approximately 90 degrees. There is a second vertical panel member having at least two faces or sides and a plurality of edges or surfaces adjoining the faces or sides. At least one edge of the second vertical panel member has at least one bore wherein the second end(s) of the element(s) engages the bore(s) and interconnects the second vertical panel member to the vertical support member at a second predefined angle. This could be but is not limited to approximately 90 degrees.

As mentioned above, there is a horizontally planar top surface in contact with and supported by the vertical member structure and similarly a means for securing the top surface to the vertical member structure in a manner providing for interchangeability and ease of assembly and disassembly. In addition, there is a horizontally planar base surface positioned beneath the vertical member structure and a means for securing the base surface to the vertical member structure in a manner providing for interchangeability and ease of assembly and disassembly.

The present invention also includes for the assembly/disassembly of a functional unit of furniture such as a bench, table, bar or any configuration which combines a number of vertical member structures to the same horizontal top but differing horizontal bases. Similarly, the present invention includes for the assembly/disassembly of a functional furniture unit which combines a number of vertical member structures to the same horizontal base but differing horizontal tops. And finally, the present invention includes for assembly/disassembly of a functional furniture unit which combines a number of vertical member structures to the same horizontal top and same horizontal base. All vertical member structures will be assembled according to aforementioned instructions for any representative vertical member structure.

The present invention allows the customer to choose from a variety of interchangeable combinations of horizontal and vertical planar panels. This choice affords each and every customer the ability to create aesthetically functional furniture units essentially customized to their specific need. The element of interchangeability allows horizontal and/or vertical panels from one unit to be quickly recombined with other horizontal and/or vertical panels in order to create a different furniture configuration. The entire furniture system is designed with the creative capability to easily meet changing needs.

These and other features of the invention are described completely in the following detailed description when taken with the drawings. The scope of the invention, however, is limited only by the claims appended hereto.

BRIEF DESCRIPTION OF THE DRAWINGS

Various embodiments of the present invention are described and illustrated herein with reference to the drawings in which like items are indicated by the same reference, in which.

DESCRIPTION OF THE PREFERRED EMBODIMENTS

Figure 1:
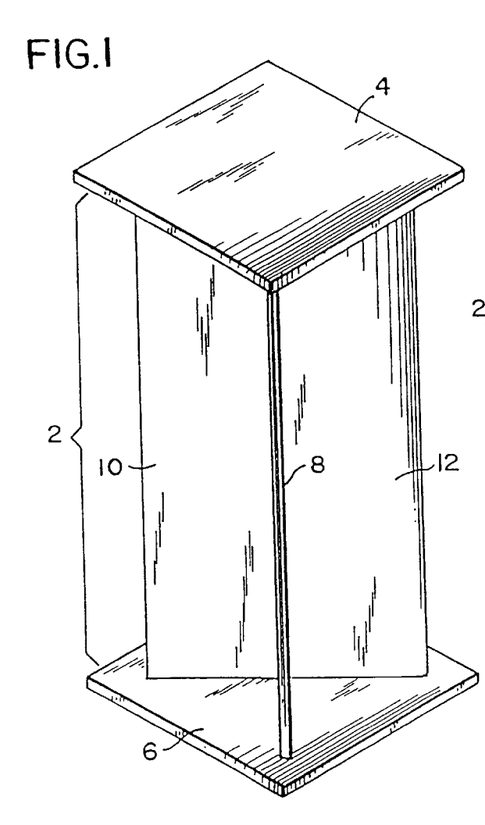
FIG. 1 is a perspective view of a first embodiment of an assembled functional unit of furniture illustrating the basic planar elements embodying the present invention.
Figure 10:
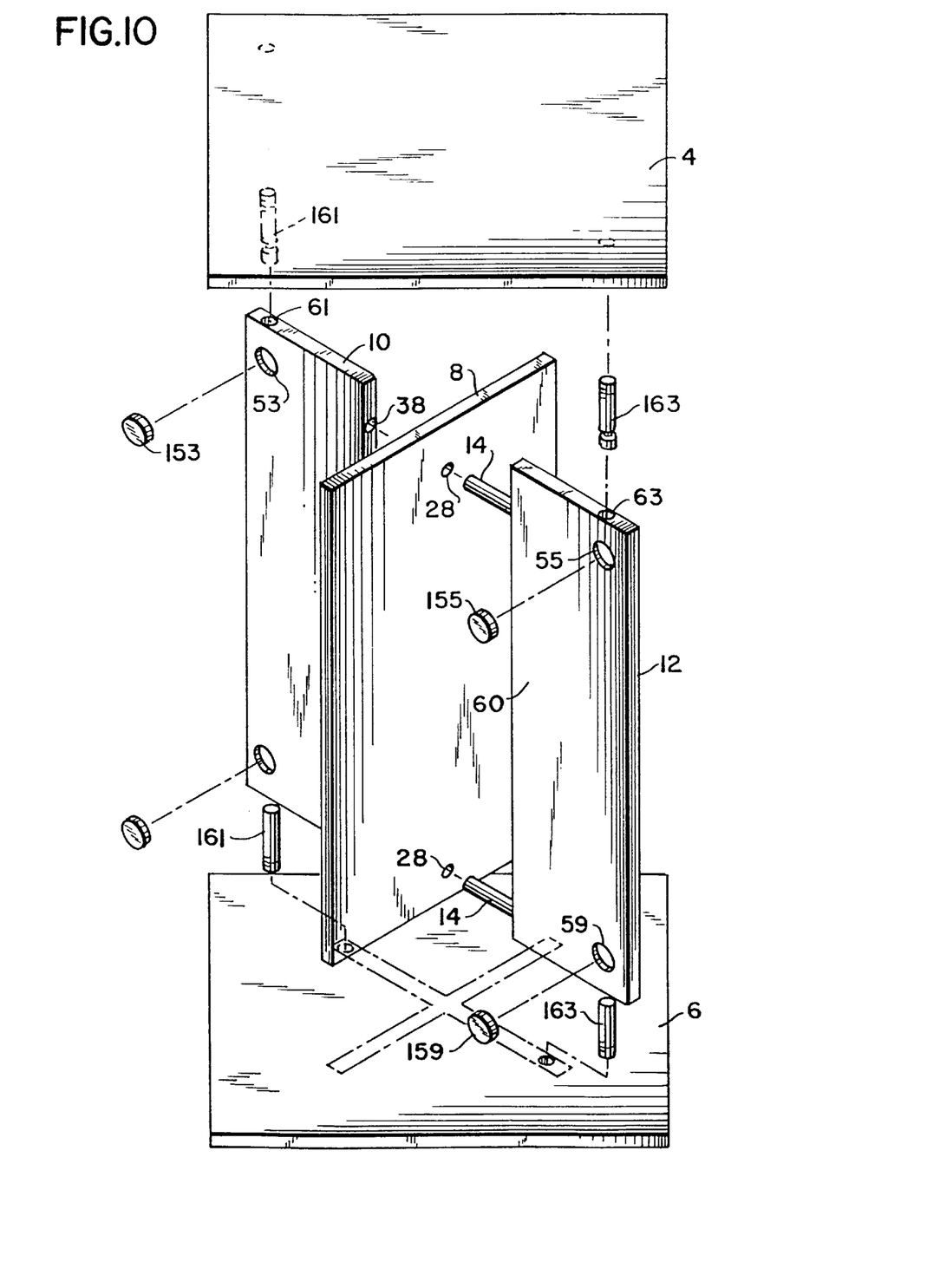
FIG. 10 is an exploded perspective view illustrating the manner in which the functional unit of furniture depicted in the first embodiment is assembled.

Turning now to the drawings, FIG. 1 is a perspective view representing one configuration of an assembled functional unit of furniture illustrating the basic planar elements embodying the features of the present invention. The functional unit of furniture includes a vertical member structure 2, a horizontally planar top surface 4, and a horizontally planar base surface 6. The vertical member structure 2 has a vertical support panel 8, a first vertical panel member 10, and a second vertical panel member 12. It also includes at least one elongated rodlike element 14 (FIG. 10).

The horizontally planar top surface 4 is in contact with and supported by the vertical member structure 2 and secured to the latter by a cam and bolt system which allows for interchangeability as well as assembly and disassembly ease. A horizontally planar base panel member 6 is positioned beneath the vertical member structure 2 and secured to the latter by a cam and bolt system which allows for interchangeability as well as assembly and disassembly ease. The horizontally planar top panel member 4 and horizontally planar base panel member 6 are interchangeable. The base surface 6 can have a shape or size equivalent to or different from the shape or size of the top surface 4. Thus, for example, the top surface 4 can be square in shape and the base surface 6 can be octagonal or both the top surface 4 and base surface 6 can be square, but different sizes or the same size. It is apparent that there are many and varied combinations of shapes and sizes for each furniture configuration.

The vertical support panel 8, first vertical panel member 10, second vertical panel member 12, horizontally planar top panel member 4, and horizontally planar base panel member 6 can be fabricated from any material such as wood, any wood derivative, plastic, any plastic derivative, metal, or any metal derivative. Any configuration of an assembled functional unit of furniture is capable of accommodating a weight bearing load of approximately but not limited to 300 pounds.

Figure 2A:
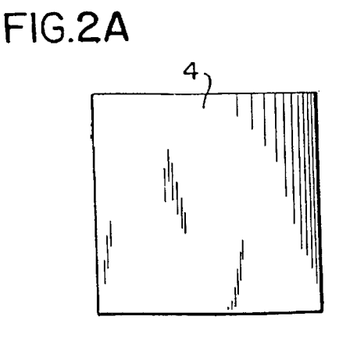
FIG. 2A is a top view of the configuration depicted in FIG. 1.

Referring to FIG. 2A this is a top view of the representative configuration depicted in FIG. 1. In the embodiment shown, the functional unit of furniture is square in top view.

Figure 2B:
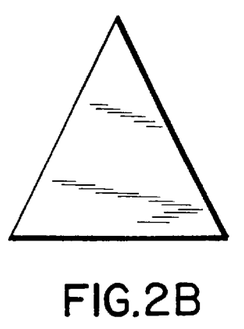
FIGS. 2B–2G are top views of alternative shapes of top and base panel members.
Figure 2C:
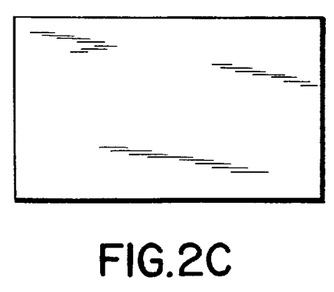
Figure 2D:
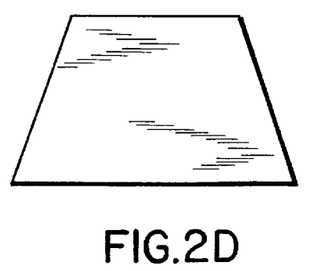
Figure 2E:
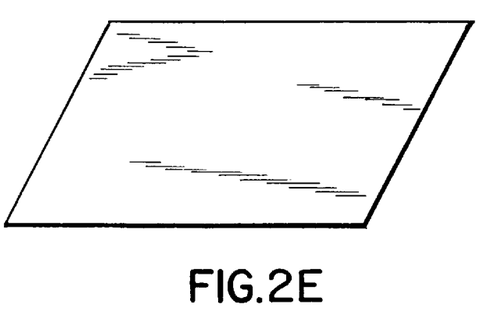
Figure 2F:
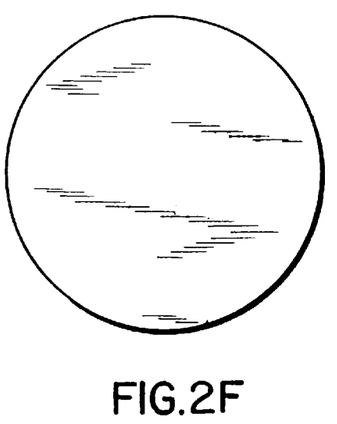
Figure 2G:
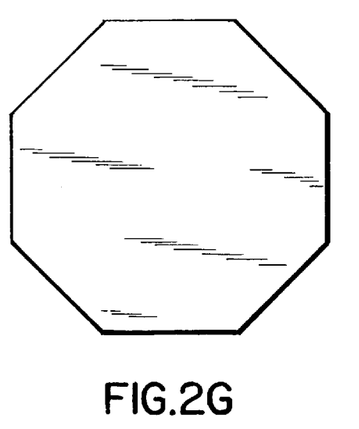

It is understood that the shape of the horizontally planar top surface 4 and horizontally planar base surface 6 is not limited to be square nor are the top surface 4 and base surface 6 limited to be matching in either size or shape. The horizontally planar top surface 4 can be triangular (FIG. 2B), rectangular (FIG. 2C), trapezoidal (FIG. 2D), rhomboid (FIG. 2E), circular (FIG. 2F), octagonal (FIG. 2G) or any arbitrary geometric shape. Similarly, the horizontally planar base surface 6 can be any one of the above-mentioned shapes and can vary in size from the horizontally planar top surface 4. The horizontally planar top surface 4 and horizontally planar base surface 6 are secured to the vertical member structure 2 using bolts, screws, rods, dowels, pins, rivets, clamps, cams, clevis pins, or any means providing for both interchangeability and easy assembly and disassembly. The top surface 4 and base surface 6 incorporate any of a plurality of means to accommodate and/or utilize the above-mentioned items and thus, secure the top surface 4 and base surface 6 to the vertical member structure 2. For example, the top surface 4 and base surface 6 can have a plurality of 61, 63 (FIG. 10) to receive the above-mentioned items. The bores located on the top surface 4 correspond to the bores located on the base surface 6 so that the top surface 4 is interchangeable with the base surface 6 regardless of the size and shape of each top surface 4 and base surface 6. The top surface has a plurality of bores and the base surface has an identical plurality of bores that are similarly situated to one another and also situated to the specific bores within the vertical member structure which allow for interconnection of the top surface and the base surface to the vertical member structure.

Referring to FIG. 10, cams 153, 155 are combined with bolts 161, 163 to attach the horizontally planar top surface 4 and horizontally planar base surface 6 to the vertical panel member 10, 12. The bolts 161, 163 are fabricated from metal, nylon, plastic, or any materials providing rigid long term durability not measurably affected by elements of temperature and humidity, and materials which are capable of providing structural integrity reliably over time. The top surface 4 and base surface 6 have at least two bores 61, 63 which are used to secure the top surface to the vertical member structure 2. The bores are spaced a predetermined distance apart within each and every top panel member 4 within each and every base are consistent with the bore measurements within each and every vertical member structure 2, insuring interchangeability of all vertical and horizontal planar members. The preferred space is 8 3/16" apart. In the preferred embodiment, the top member 4 and base member 6 have bores which are fitted with a threaded insert which will accommodate threaded bolts which can easily screw and unscrew any insert. However, any bores in the horizontal top and/or base surfaces are not limited to being fitted with threaded inserts. Any bore made into a horizontal planar surface or any extension protruding from a horizontal planar surface is for the purpose of insuring interconnection of horizontal planar members to vertical planar members.

Figure 3:
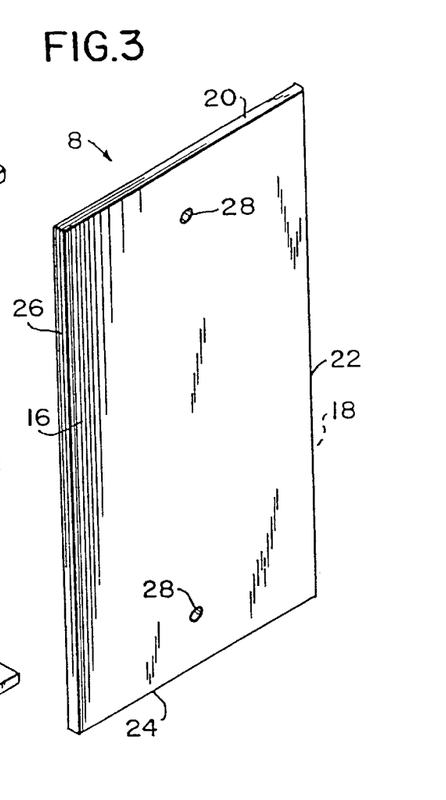
FIG. 3 depicts the shape of one embodiment of the vertical support member.

Referring to FIG. 3, this diagram depicts the shape of one embodiment of the vertical support member 8 which provides structure support for the functional unit of furniture. In the preferred embodiment, the shape of the vertical support member 8 is rectangular. It is understood that the shape of the vertical support member 8 is not limited to be rectangular. The vertical support member 8 can be triangular, square, trapezoid, rhomboid, circular, or any arbitrary geometric shape.

The vertical support member 8 has a height, width, thickness, at least two faces or sides, and a plurality of edges or surfaces adjoining the faces or sides. There is no set requirement for the height, width, and thickness for the vertical support member 8. In the preferred embodiments, however, the height of the vertical support member 8 is 12", 18", 24", 30", 36", or 42", the width of the vertical support member 8 is approximately 11½", and the thickness of the vertical support member 8 is approximately ¾". In the preferred embodiment, the vertical support member 8 has a front face 16, a back face 18, and four side edges 20,22,24, 26. A pair of holes 28 extend from the front face 16 through the vertical support member 8 to the opposing back face 18. Each hole has a diameter at least 5 mm. In the preferred embodiment, the channel is 6 mm.

Figure 4:
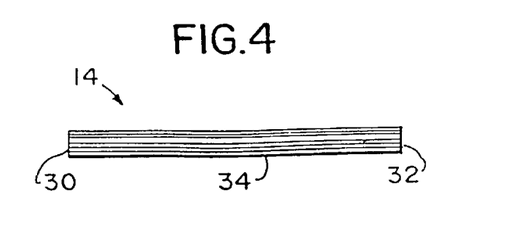
FIG. 4 is a perspective view of one elongated member used to interconnect the first vertical panel member and second vertical panel member to the vertical support member.

Turning now to FIG. 4, this illustrates a perspective view of one of the elongated rod like elements 14 used to interconnect the first vertical panel member 10 and second vertical panel member 12 to the vertical support member 8. The elongated rod like element 14 has a first end 30, second end 32, and an intermediate portion 34. The intermediate portion 34 is disposed in the hole 28. The first end 30 and second end 32 protrude from the vertical support member 8. The elongated member 14 is preferably a long metal pin that penetrates the interior edge of each vertical panel member 10,12 in sufficient depth to prevent structural damage which could result in torquing from rough handling or any similar structural mishandling.

Figure 5:
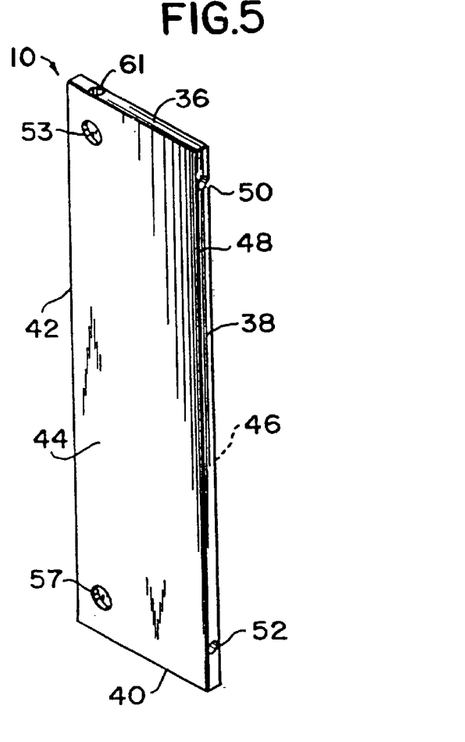
FIG. 5 depicts the shape of one embodiment of the first vertical panel member.
Figure 6:
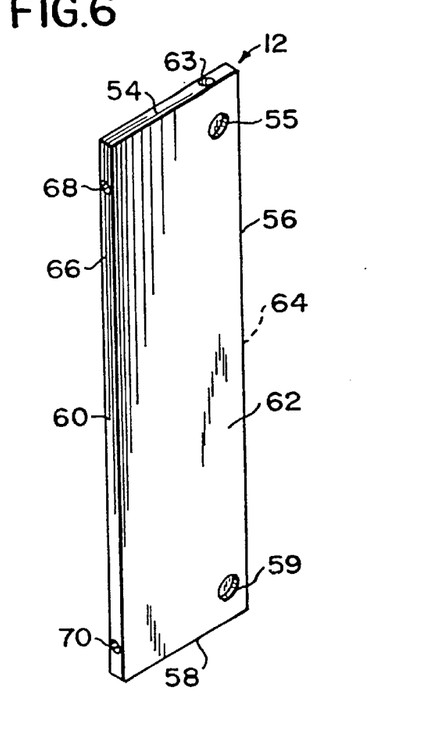
FIG. 6 depicts the shape of one embodiment of the second vertical panel member.

FIGS. 5 and 6 depict a representational shape of one embodiment of the first vertical panel member 10 and second vertical panel member 12 respectively. This shape is not limited to rectangular but may be any suitable configuration providing stable support for the top surface. Such shapes may include triangular, square, rectangular, trapezoidal, rhomboid, or circular. The first vertical panel member 10 and second vertical panel member 12 are of sufficient width so as to form a structurally sound accompaniment to the vertical support member 8. The preferred embodiment is 5 ⅜" wide. The first vertical panel member 10 and the second vertical panel member 12 interconnect to the vertical support member 8 using the elongated element (s) 14. The first vertical panel member 10 and second vertical panel member have a thickness of approximately ¾" in the preferred embodiment. This thickness is not limited to that described in the preferred embodiment. The first vertical panel member 10 having at least two faces and a plurality of interconnecting edges, has in the preferred embodiment a short top edge 36, a long interior edge 38, a short bottom edge 40, long exterior edge 42, front face 44, and opposing back face 46. The interior vertical edge 38 of the first vertical panel member 10 has at least one bore 50. In the preferred embodiment there are two bores 50,52. The first bore 50 is located near the top on the interior edge 38 of the first vertical panel member 10. The second bore 52 is positioned near the bottom of the interior edge 38 of the first vertical panel member 10. The bores 50,52 extend into the interior edge 38 at a depth sufficient to prevent structural damage from rough handling. These bores are spaced the same predetermined distance apart as holes 28 in the support panel 8.

The element 14 as previously described, engages the bore 50 within the first vertical panel member 10 and interconnects it to the vertical support member 8 through the hole 28 at a first predefined angle. This could be but is not limited to approximately 90 degrees.

In similar fashion, a second element 14 as previously described engages the bore 52 within the first vertical panel member 10 and interconnects it to the vertical support member 8 through the hole 28 at a first predefined angle. This could be but is not limited to approximately 90 degrees.

The second vertical panel member 12 can be any geometric shape such as triangular, square, rectangular, trapezoidal, rhomboid, or circular. In the preferred embodiment, the second vertical panel member 12 is rectangular in shape. It has a thickness in the preferred embodiment of approximately ¾". The second vertical panel member 12 has two faces and a plurality of edges. In the preferred embodiment there is a short top edge 54, a long interior vertial edge 60, a short bottom edge 58, long exterior edge 56, front face 62, and opposing back face 64. The interior vertical edge 60 of the second vertical panel member 12 has at least one aperture 68. In the preferred embodiment there are two bores 68,70. The first aperture 68 is located near the top of the second vertical panel member 12 on the interior edge 60. The second bore 70 is positioned near the bottom of the second vertical panel member 12 on the interior edge 60. The bores 68,70 extend into the interior edge 56 at a depth sufficient to prevent structural damage from rough handling. The bores are spaced the same predetermined distance apart as holes 28 in the support panel 8.

The second end 32 of the element 14 engages the bore 68 and interconnects the second vertical panel member 12 to the vertical support member 8 through the hole 28 at a first predefined angle. The first predefined angle can be but is not limited to or 90 degrees.

There is a second element 14 located in a second channel 28. The second end 32 of the element 14 engages the aperture 70 and interconnects the second vertical panel member 12 through the channel 28 to the vertical support member 8 at a first predefined angle. The first predefined angle is perpendicular or 90 degrees but is not limited to such measurement.

Referring to FIG. 10, the first vertical panel member 10 and second vertical panel member 12 have an aperture 53,55 located near the top extreme outer corners which is at least 15 mm to receive a metal cam. The bolts 161, 163 located on the horizontally planar top panel member 4 are positioned 61, 63 in the upper ends of the first vertical panel member 10 and second vertical panel member 12, respectively. The metal cam 153, 155 interacts with the bolts 161, 163 located on the horizontally planar top panel member 4 to secure it to the vertical member structure 2.

Likewise, there is an aperture 57,59 located near the bottom extreme outer corners of the first vertical panel member 10 and second vertical panel member 12 which is at least 15 mm in diameter to receive a metal cam 157, 159. The bolts 161, 163 located on the horizontally planar base member 6 are positioned inside at least one hole 61,63 located on the one of the edges of the first vertical panel member 10 and second vertical panel member 12, respectively. The metal cam 157, 159 interacts with the bolts 161, 163 located on the horizontally planar it to secure the base member 6 to the vertical member structure 2.

Figure 7:
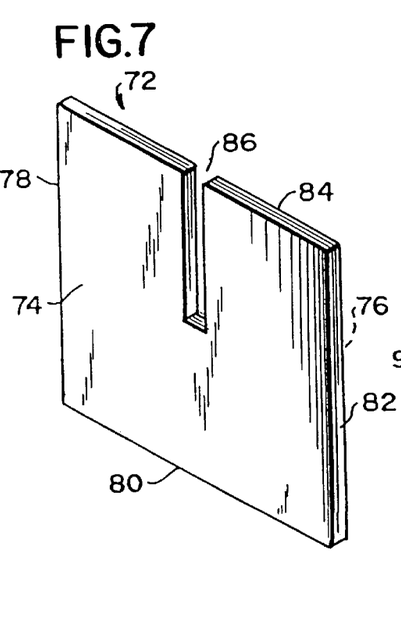
FIG. 7 is a perspective view depicting a first member of the second embodiment of the present invention.

Turning now to FIG. 7, this is a perspective view depicting a first member 72 for a second embodiment of the present invention. The second embodiment can be utilized for any material which is not subject to chipping while executing the interior cut. In this embodiment, a first member 72 has a front face 74, a back face 76, and a plurality of edges 78,80,82,84. The front face 74 has an elongated opening 86 centered halfway through its given height extending completely through the opposing back face 76 of the first member 72. The elongated opening 86 preferably has a rectangular shape, but can be any geometric shape. The first member 72 has a U-shape. The first member 72 is fabricated from wood, any wood derivative, plastic, any plastic derivative, metal, or any metal derivative.

Figure 8:
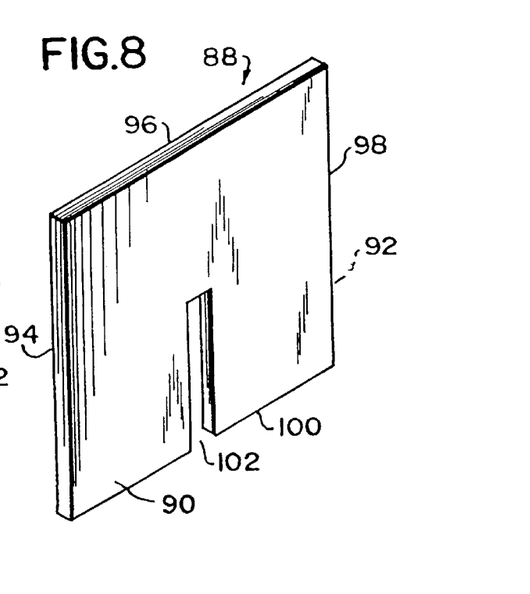
FIG. 8 is a perspective view depicting a second member of the second embodiment of the present invention.

FIG. 8 is a perspective view depicting a second member 88 for a second embodiment of the present invention. In this embodiment, the second member 88 has a front face 90, a back face 92, and a plurality of edges 94,96,98,100. The front face 90 has an elongated opening 102 centered halfway through its given height extending completely through the opposing back face 92 of the second member 88. The elongated opening 102 preferably has a rectangular shape, but can be any geometric shape. The second member 88 has a inverted U-shape. The second member 88 is fabricated from wood, any wood derivative, plastic, any plastic derivative, metal, or any metal derivative. The second member 88 has a shape identical to the first member 72 in the preferred embodiment.

Figure 9:
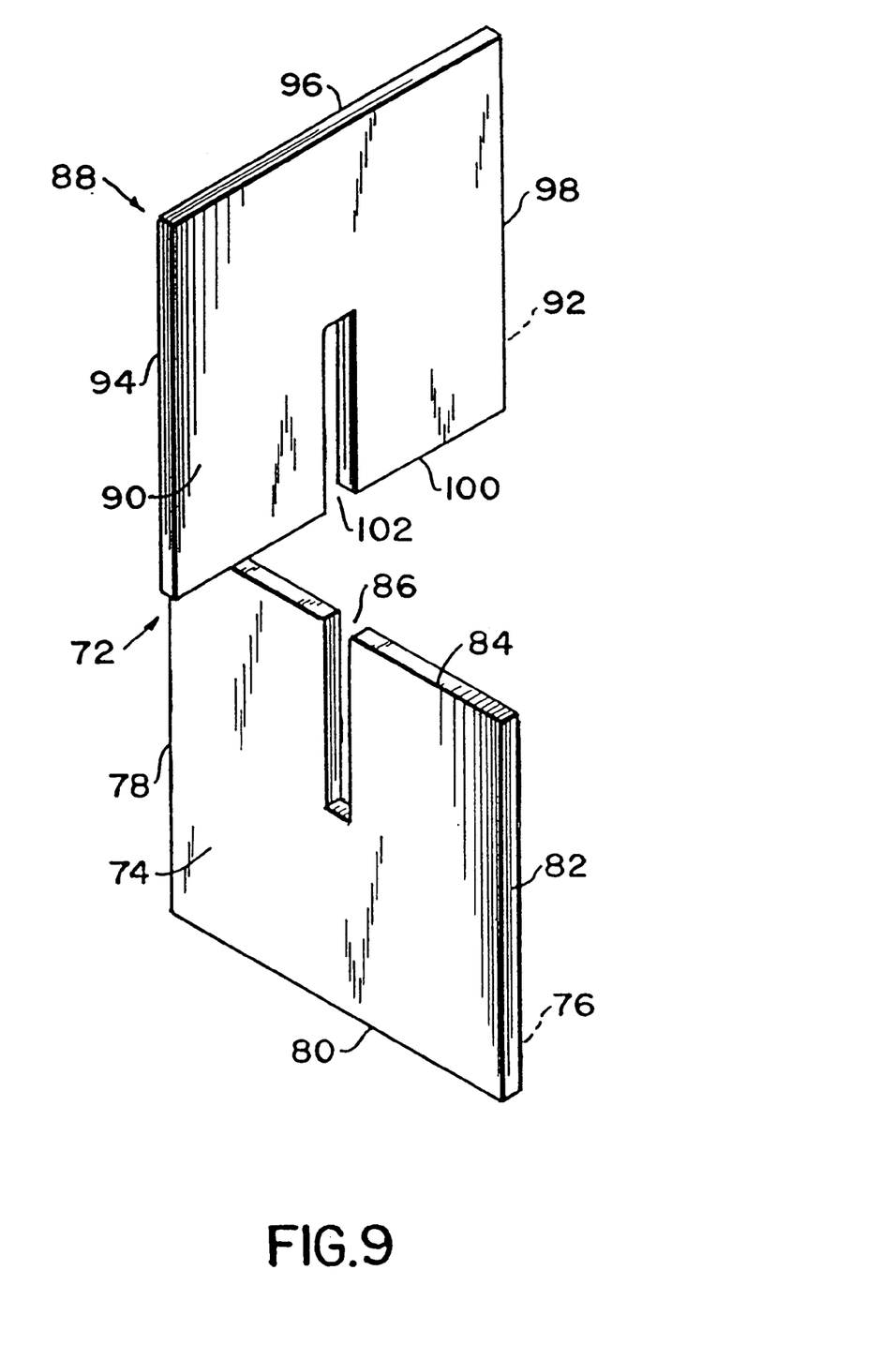
FIG. 9 is an exploded perspective view illustrating the manner in which the functional unit of furniture depicted in the second embodiment is assembled.

FIG. 9 is an exploded perspective view illustrating the manner in which vertical member structure 2 depicted in the second embodiment is assembled. The elongated opening 86 of the first member 72 engages the elongated opening 102 of the second member 88 in a manner that enables the first member 72 to dovetail the second member 88. This completes the vertical member structure 2. No rodlike elements are necessary in the second embodiment. However, cam holes and bolt holes are position in the extreme corners of each vertical member end separated by the elongated opening. These holes allow the horizontal top and bore surfaces to be secured to the vertical member structure. The horizontally planar top surface 4 is then secured to the vertical member structure 2 by means of cams and bolts as previously described. A horizontally planar base surface 6 is secured to the vertical member structure 2 for the purpose of added stability and aesthetics by means of the cam and bolt system. The horizontally planar top surface 4 and horizontally planar base surface 6 are fabricated from wood, any wood derivative, plastic, any plastic derivative, metal, or any metal derivative. The horizontally planar base surface 6 and horizontally planar top surface 4 are secured to the vertical member structure 2 using bolts, screws, rods, dowels, pins, rivets, clamps, cams, clevis pins, and any means providing for interchangeability and easy assembly and disassembly. The top surface 4 and base surface 6 can have a plurality of bores to receive a plurality of fasteners which affix the top surface 4 and base surface 6 to the vertical member structure 2.

The second embodiment of the invention also includes a method of assembling a representative configuration of functional furniture such as a bench, table, bar or any configuration which combines a number of vertical member structures to the same horizontal top but differing horizontal bases. Similarly, the present invention includes for the assembly/disassembly of a functional furniture unit which combines a number of vertical member structures to the same horizontal base but differing horizontal tops. And finally, the present invention includes for assembly/disassembly of a functional furniture unit which combines a number of vertical member structures to the same horizontal top and same horizontal base. All vertical member structures will be assembled according to aforementioned instructions for any representative vertical member structure.

The second embodiment of the present invention allows the customer to choose from a variety of interchangeable combinations of horizontal and vertical planar panels. This choice affords each and every customer the ability to create aesthetically functional furniture units essentially customized to their specific need. The element of interchangeability allows horizontal and/or vertical panels from one unit to be quickly recombined with other horizontal and/or vertical panels in order to create a different furniture configuration.

The entire furniture system is designed with the creative capability to easily meet changing needs. FIG. 10 is an exploded perspective view illustrating the manner of assembly for a representational functional unit of furniture as described in the first embodiment. All essential elements are depicted. FIG. 11 is a step by step assembly method.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention defined by the appended claims.

What is claimed is:

1. A functional unit of furniture comprising
    a vertical support panel having a pair of opposed faces, a vertical centerline, and a pair of holes extending between said faces and spaced a first predetermined distance apart on said centerline,
    a pair of elongated rod-like elements received through said holes, each rodlike element having a first end and a second end,
    first and second vertical panel members, each vertical panel member having a vertical interior edge, a pair of opposed upper and lower ends, and a pair of bores spaced said first predetermined distance apart extending into said vertical edge, each vertical interior edge being received against a respective one of said opposed faces, said first ends of said rod-like elements being received in said bores in said vertical edge of said first vertical panel member, said second ends of said rodlike elements being received in said bores in said vertical edge of said second vertical panel member, said opposed ends each having a bore extending therein, said bores in said upper ends of said first and second panel members being spaced a second predetermined distance apart, said bores in said lower ends of said first and second panel members being spaced said second predetermined distance apart,
    horizontal base and top panel members received against respective upper and lower ends of said vertical panel members, each horizontal panel member having a face with a pair of bores extending therein and spaced said second predetermined distance apart, said bores in said face of said horizontal top panel member aligning with said bores in said upper ends of said vertical panel members, said bores in said face of said horizontal base panel member aligning with said bores in said lower ends of said second vertical panel members, and
    securing means received in said aligned bores of said horizontal and vertical panel members for securing said horizontal panel members to said vertical panel members, whereby
    different sizes and shapes of base and top panel members can be used, and base and top panel members can be interchanged, so long as the second predetermined distance remains the same for all combinations.

2. A functional unit as in claim 1 wherein said unit is capable of accommodating a weight bearing load approximately but not limited to 300 pounds.

3. A functional unit as in claim 1 wherein the height of the vertical support member is selected from the group consisting of approximately 12", 18", 24", 30", 36" and 42".

4. A functional unit as in claim 1 wherein the top surface has a geometric shape in top view selected from the group consisting of triangular, square, rectangular, trapezoidal, rhomboid, octagonal, circular, and any arbitrary geometric shape.

5. A functional unit as in claim 1 wherein the base surface has a geometric shape in top view selected from the group consisting of triangular, square, rectangular, trapezoidal, rhomboid, octagonal, circular and any arbitrary geometric shape.

6. A functional unit as in claim 1 wherein the vertical support member further having a thickness of approximately ¾".

7. A functional unit as in claim 1 wherein the first vertical panel member further having a thickness of approximately ¾".

8. A functional unit as in claim 1 wherein the second vertical panel member has a thickness of approximately ¾".

9. A funtional unit as in claim 1 wherein the planar top surface has a thickness of approximately ¾".

10. A funtional unit as in claim 1 wherein the planar base surface has a thickness of approximately ¾".

11. A functional unit as in claim 1 wherein the vertical support member has a width of approximately 11 ½".

12. A functional unit as in claim 1 wherein the first vertical panel member has a width of approximately 5 ⅜".

13. A functional unit as in claim 1 wherein the second vertical panel member has a width of approximately 5 ⅜".

14. A functional unit as in claim 1 wherein the planar top surface has a shape selected from the group consisting of approximately square, octagonal and circular and has a width selected from the group consisting of approximately 12", 14", 16"18", 20" and 24".

15. A functional unit as in claim 1 wherein the planar base surface has a shape selected from the group consisting of approximately square, octagonal and circular and has a width selected from the group consisting of approximately 12", 14", 16"18", 20" and 24".

16. A functional unit as in claim 1 wherein the top panel member has two bores used to secure the top panel member to the vertical panel members and the base panel member has two bores used to secure the base panel member to the vertical panel members.

17. A functional unit as in claim 16 wherein the two bores of the top panel member are spaced approximately 8 3/16" apart and the two bores of the base panel member are spaced approximately 8 3/16" apart.

18. A functional unit as in claim 1 wherein the vertical panel members are fabricated from the group consisting of wood, any wood derivative, plastic, any plastic derivative, metal, and any metal derivative.

19. A functional unit as in claim 1 wherein the top panel member is fabricated from the group consisting of wood, any wood derivative, plastic, any plastic derivative, metal, and any metal derivative.

20. A functional unit as in claim 1 wherein the base panel member is fabricated from the group consisting of wood, any wood derivative, plastic, any plastic derivative, metal, and any metal derivative.

21. A functional unit as in claim 1 wherein the securing means for securing the top panel member to the vertical panel members comprise bolts.

22. A functional unit as in claim 21 wherein the bolts are fabricated from the group consisting of metal, nylon, plastic, and any other material capable of providing structural integrity reliably over time.

23. A functional unit as in claim 21 wherein the vertical panel members have at least one aperture to receive a metal cam, the metal cam interacts with the bolts to secure the horizontal top panel member to the vertical panel member.

24. A functional unit as in claim 1 wherein the securing means for securing the base panel member to the vertical panel members comprise bolts.

25. A functional unit as in claim 24 wherein the vertical panel members include bore holes in their lower ends to receive the bolts.

26. A functional unit as in claims 24 wherein the bolts are fabricated from the group consisting of metal, nylon, plastic, and any other material capable of providing structural integrity reliably over time.

27. A functional unit as in claim 24 wherein the vertical panel members have at least one aperture to receive a metal cam, the metal cam interacts with the bolts to secure the horizontal base panel member to the vertical panel member.

28. A functional unit as in claim 1 wherein the element is a long metal pin.

29. A functional unit as in claim 1 wherein the element is a rod.

30. A functional unit as in claim 1 wherein the element is cylindrical.

31. A functional unit as in claim 1 wherein the element is fabricated from the group consisting of metal, nylon, plastic, and any other material not affected by the elements and is capable of providing structural integrity over time.

32. A functional unit as in claim 1 wherein the first vertical panel member has a width and the bore extends into the interior vertical edge at a depth which is approximately one half the width of the first vertical panel member.

33. A functional unit as in claim 1 wherein the second vertical panel member has a width and the aperture extends into the interior vertical edge at a depth which is approximately one half the width of the second vertical panel member.

34. A functional unit as in claim 1 wherein the first vertical panel member has a width that is approximately one half the width of the vertical support member.

35. A functional unit as in claim 1 wherein the second vertical panel member has a width that is approximately one half the width of the vertical support member.

36. A functional unit as in claim 1 wherein the top panel member is interchangeable with the base panel member.

37. A functional unit as in claim 1 wherein the top panel member has a shape equivalent to the base panel member.

38. A functional unit as in claim 1 wherein the top panel member has a size equivalent to the base panel member.

39. A functional unit as in claim 1 wherein the top panel member has a size and shape different than the size and shape of the base panel member.

40. A functional unit as in claim 1, wherein the second predefined angle is approximately 90 degrees.

41. Functional units of furniture comprising a plurality of vertical member structures each structural member comprising a vertical support member having a predetermined height and width, the vertical support member having two faces and a plurality of edges, one of the faces having at least one hole extending through to the opposing face of the vertical support member, an associated elongated rodlike element for each hole, the element having a first end, second end, and intermediate portion, the intermediate portion of the element being disposed in the hole, the first end and second end protruding from the vertical support member, a first vertical panel member have two faces and a plurality of edges, an interior edge of the first vertical panel member having at least one bore wherein the first ends of the elements engage the bores and interconnects the first vertical panel member to the vertical support member at a first predefined angle approximately 90 degrees, and a second vertical panel having a two faces and a plurality of edges, an interior edge of the second vertical panel member having at least one bore wherein the second ends of the elements engage the apertures and interconnects the second vertical panel member to the vertical support member at a second predefined angle approximately 90 degrees;

a plurality of horizontally planar top panel members in contact with and supported by respective vertical member structures;

means for securing the top panel members to the plurality of vertical member structures in a manner providing for interchangeability and ease of assembly and disassembly a plurality of horizontally planar base panel members positioned beneath respective vertical member structures; and means for securing the base panel members to the plurality of vertical member structures in a manner providing for interchangeability and ease of assembly and disassembly.

42. A method for assembling functional units of furniture comprising the steps of:

(a) inserting a plurality of rodlike elements through a plurality of holes through a vertical support member, the holes being positioned in vertical alignment, each rodlike element having a first end and second end which protrude from the associated hole;

(b) positioning a first vertical panel member having a plurality of bores corresponding to the first ends of the rodlike elements;

(c) pressing the first vertical panel member onto the first ends of the rodlike elements;

(d) positioning a second vertical panel member having a plurality of apertures corresponding to the second ends of the rodlike elements;

(e) pressing the second vertical panel member into the second ends of the rodlike elements;

(f) repeating steps (a)–(e) until creating a desired number of vertical member structures;

(g) attaching at least one horizontally planar top panel member to at least one of the vertical member structures; and (h) Affixing at least one horizontally planar base panel member to at least one of the vertical member structures if desired.

43. A method as in claim 42 wherein the attaching at least one horizontally planar top panel member to at least one of the vertical member structures is done using bolts, screws, rods, dowels, pins, rivets, clamps, clevis pins or any means providing for easy assembly and disassembly.

44. A method as in claim 43 wherein the affixing step is accomplished using bolts, screws, rods, dowels, pins, rivets, clamps, clevis pins or any means providing for easy assembly and disassembly.

45. A method as in claim 42, wherein the attaching step comprises the horizontally planar top panel member having at least two bores separated by a consistent length and are fitted with nylon thread inserts which accommodates a plurality of bolts.

46. A method as in claim 42 wherein the affixing step comprises the horizontally planar base panel member having at least two bores fitted with nylon thread inserts which accommodate a plurality of bolts.

47. A method as in claim 42 wherein the vertical member structures have at least four cams.

48. A method as in claim 42 further comprising the step of turning cams located on the vertical member structure.

49. A method as in claim 48 wherein the cams are turned clockwise for assembly.

50. A method as in claim 48 wherein the cams are turned counter clockwise for disassembly.

51. A method as in claim 48 wherein the turning step is done using an allen wrench.

52. A method as in claim 48 wherein the turning step is accomplished using a screwdriver.

53. A method for assembling a functional unit of furniture comprising the steps of:

(a) inserting a rodlike element having a first end, second end, and intermediate portion into vertical support member having a first hole, the intermediate portion being disposed in the first hole, the first end and second end of the element protruding from the vertical support member, (b) introducing a rodlike element having a first end, second end, and intermediate portion into a hole in vertical alignment with the first hole, (c) repeating step (b) for all holes of the vertical support member in vertical alignment with the hole;

(d) interlocking a first vertical panel member having bores corresponding to the first ends of the rodlike elements so that the first vertical panel member interlocks to the vertical support member at a first predefined angle;

(e) interlocking a second vertical panel member having bores corresponding to the second ends of the rodlike elements so that the second vertical panel member interlocks to the vertical support member at a second predefined angle;

(f) securing a horizontally planar top panel member to the first vertical panel member and second vertical panel member; and (g) affixing a horizontally planar base panel member to the first vertical panel member and second vertical panel member.

* * * * *